United States Patent
Miller et al.

(10) Patent No.: US 10,847,844 B2
(45) Date of Patent: Nov. 24, 2020

(54) INTERMEDIATE FRAME, ELECTROCHEMICAL SYSTEMS, AND METHODS

(71) Applicant: Calera Corporation, Moss Landing, CA (US)

(72) Inventors: John Hunter Miller, Woodside, CA (US); Thomas H. McWaid, Santa Cruz, CA (US); Ryan J. Gilliam, San Jose, CA (US)

(73) Assignee: Calera Corporation, Moss Landing, CA (US)

( * ) Notice: Subject to any disclaimer, the term of this patent is extended or adjusted under 35 U.S.C. 154(b) by 390 days.

(21) Appl. No.: 15/498,341

(22) Filed: Apr. 26, 2017

(65) Prior Publication Data

US 2017/0309969 A1    Oct. 26, 2017

Related U.S. Application Data

(60) Provisional application No. 62/327,635, filed on Apr. 26, 2016.

(51) Int. Cl.
| | |
|---|---|
| *C25B 1/10* | (2006.01) |
| *C25B 9/16* | (2006.01) |
| *H01M 10/42* | (2006.01) |
| *H01M 10/05* | (2010.01) |
| *H01M 2/14* | (2006.01) |

(52) U.S. Cl.
CPC ......... *H01M 10/4214* (2013.01); *H01M 2/14* (2013.01); *H01M 10/05* (2013.01)

(58) Field of Classification Search
CPC .. C25B 1/10; C25B 9/16; C25D 17/00; C25D 17/02

USPC ........................................................ 204/252
See application file for complete search history.

(56) References Cited

U.S. PATENT DOCUMENTS

| | | | |
|---|---|---|---|
| 4,108,752 A | 8/1978 | Pohto et al. | |
| 4,111,779 A | 9/1978 | Seko et al. | |
| 4,225,411 A | 9/1980 | Gruene | |
| 4,330,378 A | 5/1982 | Boltersdorf et al. | |
| 4,437,967 A * | 3/1984 | Sanchez | G01N 27/44769 |
| | | | 204/639 |
| 4,643,818 A | 2/1987 | Seko et al. | |
| 7,735,274 B2 | 6/2010 | Constantz et al. | |
| 7,744,761 B2 | 6/2010 | Constantz et al. | |

(Continued)

FOREIGN PATENT DOCUMENTS

| | | |
|---|---|---|
| EP | 2253600 A1 | 11/2010 |
| WO | WO-02071524 A1 | 9/2002 |

(Continued)

OTHER PUBLICATIONS

International search report with written opinion dated Jul. 21, 2017 for PCT/US2017/029567.

(Continued)

*Primary Examiner* — Zulmariam Mendez
(74) *Attorney, Agent, or Firm* — Calera Corporation; Vandana Bansal

(57) ABSTRACT

Provided herein are intermediate frame systems and methods, comprising one or more arrays of channels on upper and/or lower edges of the intermediate frame wherein the channels are configured to provide a spatially uniform flow of electrolyte through the plane of the intermediate frame.

17 Claims, 9 Drawing Sheets

(56) References Cited

U.S. PATENT DOCUMENTS

| | | |
|---|---|---|
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,137,455 B1 | 3/2012 | Constantz et al. |
| 9,187,834 B2 | 11/2015 | Albrecht et al. |
| 2003/0203273 A1 | 10/2003 | Puttaiah et al. |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0202410 A1 | 8/2009 | Kawatra et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0108537 A1 | 5/2010 | Perego et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0136455 A1 | 6/2010 | Winter |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0076587 A1 | 3/2011 | Wang et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2014/0162095 A1 | 6/2014 | Coad et al. |
| 2014/0377688 A1 | 12/2014 | Dotsch et al. |
| 2015/0233000 A1* | 8/2015 | Roemer ............... H01M 8/242 429/457 |

FOREIGN PATENT DOCUMENTS

| | | |
|---|---|---|
| WO | WO-2008018928 A2 | 2/2008 |
| WO | WO-2008148055 A1 | 12/2008 |
| WO | WO-2009006295 A2 | 1/2009 |
| WO | WO-2009086460 A1 | 7/2009 |
| WO | WO-2009146436 A1 | 12/2009 |
| WO | WO-2009155378 A1 | 12/2009 |
| WO | WO-2010006242 A1 | 1/2010 |
| WO | WO-2010008896 A1 | 1/2010 |
| WO | WO-2010009273 A1 | 1/2010 |
| WO | WO-2010030826 A1 | 3/2010 |
| WO | WO-2010039903 A1 | 4/2010 |
| WO | WO-2010039909 A1 | 4/2010 |
| WO | WO-2010048457 A1 | 4/2010 |
| WO | WO-2010051458 A1 | 5/2010 |
| WO | WO-2010055152 A1 | 5/2010 |
| WO | WO-2010068924 A1 | 6/2010 |
| WO | WO-2010074686 A1 | 7/2010 |
| WO | WO-2010074687 A1 | 7/2010 |
| WO | WO-2010087823 A1 | 8/2010 |
| WO | WO-2010091029 A1 | 8/2010 |
| WO | WO-2010093713 A1 | 8/2010 |
| WO | WO-2010093716 A1 | 8/2010 |
| WO | WO-2010101953 A1 | 9/2010 |
| WO | WO-2010104989 A1 | 9/2010 |
| WO | WO-2010132863 A1 | 11/2010 |
| WO | WO-2010136744 A1 | 12/2010 |
| WO | WO-2011008223 A1 | 1/2011 |
| WO | WO-2011017609 A1 | 2/2011 |
| WO | WO-2011038076 A1 | 3/2011 |
| WO | WO-2011049996 A1 | 4/2011 |
| WO | WO-2011066293 A1 | 6/2011 |
| WO | WO-2011075680 A1 | 6/2011 |
| WO | WO-2011081681 A1 | 7/2011 |
| WO | WO-2011097468 A2 | 8/2011 |
| WO | WO-2011102868 A1 | 8/2011 |
| WO | WO-2017189680 | 11/2017 |

OTHER PUBLICATIONS

Andersson, et al. High power diode laser cladding. Fabricating and Metalworking. Mar. 2014; 24-26.
Constantz, B. "The Risk of Implementing New Regulations on Game-Changing Technology: Sequestering CO2 in the Built Environment" AGU, Sep. 2009; 90(22), Jt. Assem, Suppl., Abstract.
"Office action dated Feb. 9, 2017 for U.S. Appl. No. 14/446,791".
Office action dated Mar. 4, 2015 for U.S. Appl. No. 13/474,598.
Office action dated Apr. 18, 2017 for U.S. Appl. No. 14/460,697.
Office action dated Apr. 23, 2015 for U.S. Appl. No. 13/474,599.
Office action dated Jun. 11, 2015 for U.S. Appl. No. 13/799,131.
Office action dated Jul. 9, 2015 for U.S. Appl. No. 13/474,598.
Office action dated Aug. 6, 2015 for U.S. Appl. No. 13/474,598.
Office action dated Aug. 14, 2015 for U.S. Appl. No. 13/474,599.

(56) References Cited

OTHER PUBLICATIONS

Office action dated Aug. 26, 2016 for U.S. Appl. No. 14/460,697.
Office action dated Aug. 27, 2015 for U.S. Appl. No. 13/474,598.
Office action dated Sep. 17, 2015 for U.S. Appl. No. 13/799,131.
Office action dated Oct. 19, 2016 for U.S. Appl. No. 14/446,791.
"Office action dated Dec. 19, 2016 for U.S. Appl. No. 14/460,697".

* cited by examiner

INTERMEDIATE FRAME, ELECTROCHEMICAL SYSTEMS, AND METHODS

CROSS-REFERENCE TO RELATED APPLICATION

This application claims benefit to U.S. Provisional Patent Application No. 62/327,635, filed Apr. 26, 2016, which is incorporated herein by reference in its entirety in the present disclosure.

BACKGROUND

Three chamber electrolytic cells may contain an anode chamber, a cathode chamber, and an intermediate chamber. These electrolytic cells may contain ion exchange membranes such as anion and cation exchange membranes interposed between the anode and the cathode such that the anion exchange membrane is interposed between the anode and the intermediate chamber and the cation exchange membrane is interposed between the cathode and the intermediate chamber. The intermediate chamber in the electrolytic cells may be subject to several constraints such as, the separation of the membranes by the intermediate chamber may need to be minimized; the brine flow through the intermediate chamber may need to be uniform; and the membranes may not contact each other. Therefore, there is a need for the intermediate chamber that results in adequate distance between the membranes as well as provides uniform flow of the brine in the cell.

SUMMARY

In one aspect, there is provided an intermediate frame in an electrochemical cell, comprising one or more arrays of channels on upper and/or lower edges of the intermediate frame wherein the channels are configured to provide a spatially uniform flow of electrolyte through the plane of the intermediate frame.

In some embodiments of the foregoing aspect, the intermediate frame comprises between about 1-20 or between about 3-10 channels in each of the one or more arrays. In some embodiments of the foregoing aspect and embodiments, the intermediate frame comprises between about 1-35 or between about 3-35 of the arrays of channels on each of the upper and/or lower edges of the intermediate frame. In some embodiments of the foregoing aspect and embodiments, each of the channels has a depth of between about 0.25-10 mm or between about 0.25-4 mm. In some embodiments of the foregoing aspect and embodiments, each of the channels is in a shape of a circle, semi-circle, rectangular, triangular, trapezoidal, or the like.

In some embodiments of the foregoing aspect and embodiments, the intermediate frame further comprises distribution pockets located at an end of each of the one or more arrays of channels, configured to distribute the electrolyte to the one or more arrays of channels. In some embodiments of the foregoing aspect and embodiments, the distribution pockets are between about 6-70 mm wide.

In some embodiments of the foregoing aspect and embodiments, the intermediate frame further comprises a manifold located at an end of the upper and/or the lower edges of the intermediate frame, operably connected to the distribution pockets and configured to provide the electrolyte to the distribution pockets.

In some embodiments of the foregoing aspect and embodiments, the intermediate frame further comprises a cap over each of the one or more arrays of channels and the corresponding distribution pocket configured to prevent the electrolyte from leaking.

In some embodiments of the foregoing aspect and embodiments, the intermediate frame further comprises a shim under the cap and over each of the one or more arrays of channels and the corresponding distribution pocket configured to prevent the cap from flowing into the channels. In some embodiments of the foregoing aspect and embodiments, the shim is made of material selected from the group consisting of titanium, titanium alloy, stainless steel alloy, nickel, nickel alloy, aluminum, aluminum alloy, copper, copper alloy, hastelloy alloy, inconel alloy, glass-filled chlorinated polyvinyl chloride (CPVC), Rulon®, polyetheretherketone (PEEK), glass-filled polytetrafluoroethylene (PTFE), polypropylene (PP), glass-filled polypropylene (PP), fiberglass reinforced plastic (FRP), polycarbonate, and combinations thereof. In some embodiments of the foregoing aspect and embodiments, the shim has a thickness of between about 0.1-1 mm.

In some embodiments of the foregoing aspect and embodiments, the intermediate frame further comprises a reinforcement bar over a portion of the cap configured to prevent the cap from bulging out.

In some embodiments of the foregoing aspect and embodiments, the thickness of the intermediate frame is between about 0.75-30 mm or between about 1-6 mm.

In some embodiments of the foregoing aspect and embodiments, the intermediate frame further comprises a spacer in an open area in middle of the intermediate frame. In some embodiments of the foregoing aspect and embodiments, the intermediate frame further comprises means to hold the spacer in place.

In some embodiments of the foregoing aspect and embodiments, the intermediate frame is configured to withstand temperature between about 70-150° C. In some embodiments of the foregoing aspect and embodiments, wherein the intermediate frame is configured to withstand pressure between 2-10 psi.

In some embodiments of the foregoing aspect and embodiments, the intermediate frame is made of titanium or polymeric material.

In one aspect, there is provided an intermediate frame in an electrochemical cell, comprising one or more arrays of channels on upper and/or lower edges of the intermediate frame wherein the channels are configured to provide a spatially uniform flow of electrolyte through the plane of the intermediate frame wherein the intermediate frame comprises between about 1-20 or 3-7 channels in each of the arrays, wherein the intermediate frame comprises between about 1-35 or 5-25 arrays of channels on each of the upper and/or lower edges of the intermediate frame, and optionally wherein the depth of each of the channel is between about 0.25-10 mm or 0.25-4 mm.

In one aspect, there is provided an electrochemical cell, comprising the intermediate frame of any one of the preceding aspects and embodiments.

In one aspect, there is provided a method of using an intermediate frame in an electrochemical cell, comprising:

applying voltage to an anode and a cathode in an electrochemical cell;

contacting the anode with an anode electrolyte in an anode chamber;

contacting the cathode with a cathode electrolyte in a cathode chamber; and contacting an electrolyte with an intermediate frame wherein the intermediate frame comprises one or more arrays of channels on upper and/or lower edges of the intermediate frame wherein the channels are configured to provide a spatially uniform flow of electrolyte through the plane of the intermediate frame.

In some embodiments of the foregoing aspect and embodiments, the intermediate frame withstands temperature between about 70-150° C. and/or the intermediate frame withstands pressure between 2-10 psi.

In some embodiments of the foregoing aspect and embodiments, the channels provide a spatially uniform flow of the electrolyte through the width of the electrochemical cell.

In some embodiments of the foregoing aspect and embodiments, the method further comprises contacting an anion exchange membrane between the intermediate frame and the anode and contacting a cation exchange membrane between the intermediate frame and the cathode.

In some embodiments of the foregoing aspect and embodiments, the intermediate frame provides advantages selected from the group consisting of minimal membrane separation; uniform current density; no bending of the membrane; low dynamic pressure in the cell; minimal resistance to the electrolyte and gas; and combinations thereof.

In some embodiments of the foregoing aspect and embodiments, the intermediate frame comprises between about 1-20 or 3-10 channels in each of the one or more arrays. In some embodiments of the foregoing aspect and embodiments, the intermediate frame comprises between about 1-35 or 3-35 of the arrays of channels on each of the upper and/or lower edges of the intermediate frame. In some embodiments of the foregoing aspect and embodiments, each of the channels has a depth of between about 0.25-10 mm or 0.25-4 mm. In some embodiments of the foregoing aspect and embodiments, each of the channels is in a shape of a circle, semi-circle, rectangular, triangular, or trapezoidal.

In some embodiments of the foregoing aspect and embodiments, the method further comprises contacting the electrolyte with distribution pockets located at an end of each of the one or more arrays of channels before contacting the electrolyte with the one or more arrays of channels.

In some embodiments of the foregoing aspect and embodiments, the method further comprises contacting the electrolyte with a manifold located at an end of the upper and/or the lower edges of the intermediate frame before contacting the electrolyte with the distribution pockets.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

DETAILED DESCRIPTION

Figure 1:
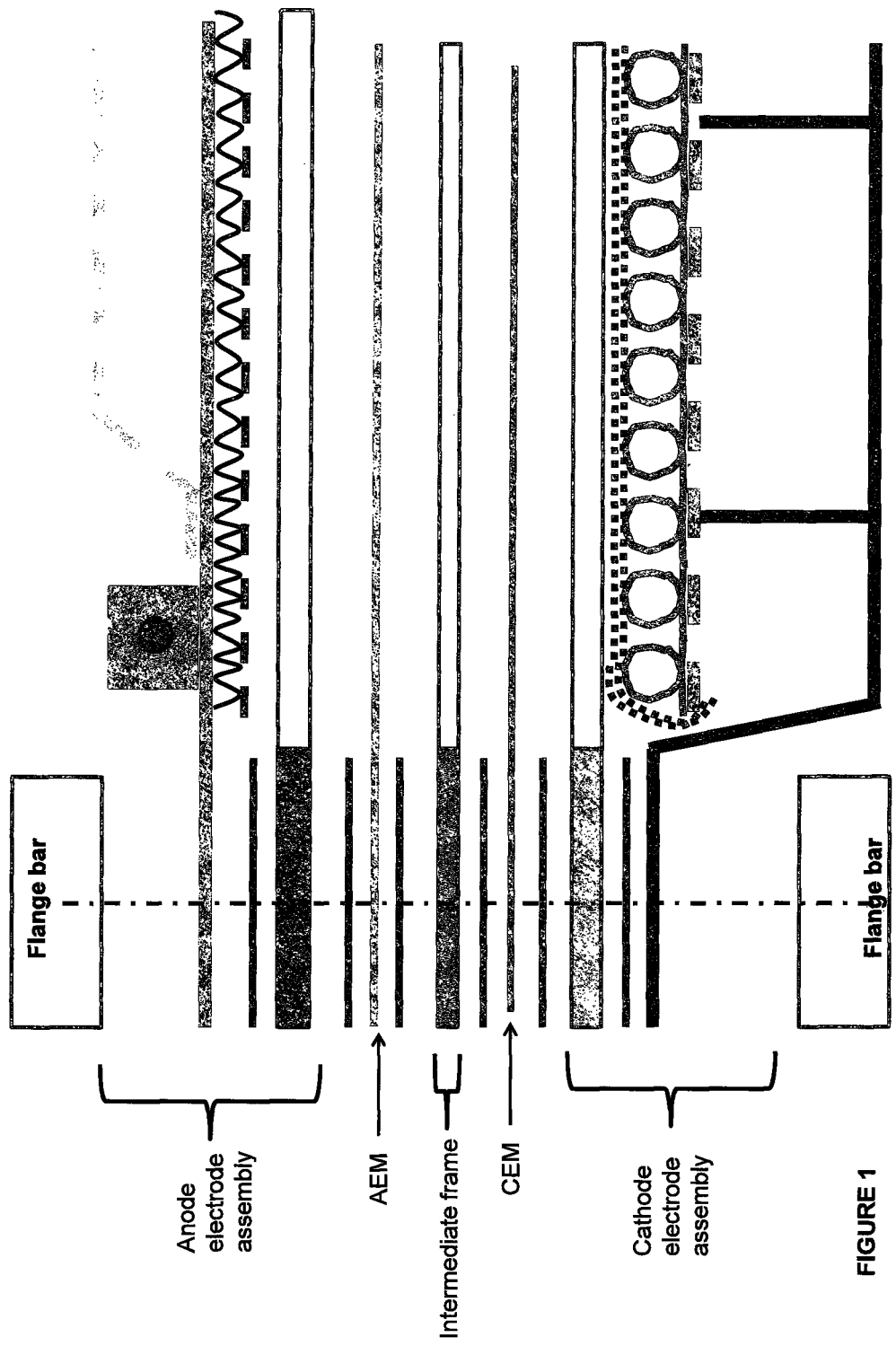
FIG. 1 illustrates some embodiments related to the electrochemical cell containing the intermediate frame.

Disclosed herein is an intermediate frame, electrochemical systems comprising the intermediate frame, and methods of using and making the same.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges that are presented herein with numerical values may be construed as "about" numericals. The "about" is to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Intermediate Frame, Electrochemical Systems, and Methods

In an electrochemical system, there is an anode chamber that houses an anode and an anode electrolyte. There is a cathode chamber that houses a cathode and a cathode electrolyte and the anode chamber and the cathode chamber are separated by an ion exchange membrane (IEM). The IEM may be an anion exchange membrane (AEM), a cation exchange membrane (CEM), or both depending on the desired reactions at the anode and the cathode. In between these components, various additional separator components may be provided to separate, e.g. the AEM from the anode, the CEM from the cathode and/or AEM from the CEM as well as provide mechanical integrity to the membranes. In addition to these components, individual gaskets or gasket tape may be provided in between and along the outer perimeter of the components to seal the compartments from fluid leakage.

In some electrolyzers, the electrochemical system includes the anode and the cathode separated by both the AEM and the CEM creating a third chamber in the middle containing the electrolyte. Provided herein is a unique intermediate frame that separates the AEM from the CEM and creates the intermediate chamber in the cell. The intermediate frame described herein provides amongst other advantages, a spatially uniform electrolyte flow between the two membranes; provides means to collect electrolyte flow uniformly across the cell width from opposite end of the cell; and provides a substrate to which a spacer can be attached.

In an illustrative embodiment, an electrochemical cell with an intermediate frame is shown in FIG. 1. As illustrated, the cell houses an anode electrode assembly in the anode chamber and a cathode electrode assembly in the cathode chamber. The two chambers are separated by the AEM and the CEM. Between the AEM and the CEM is the intermediate frame of the invention. Gaskets may be present around the cell's active area in order to form liquid seals. Separators, woven or unwoven, may be present to prevent the membranes from touching each other. Many such combinations are possible and are within the scope of the invention.

Figure 2A:
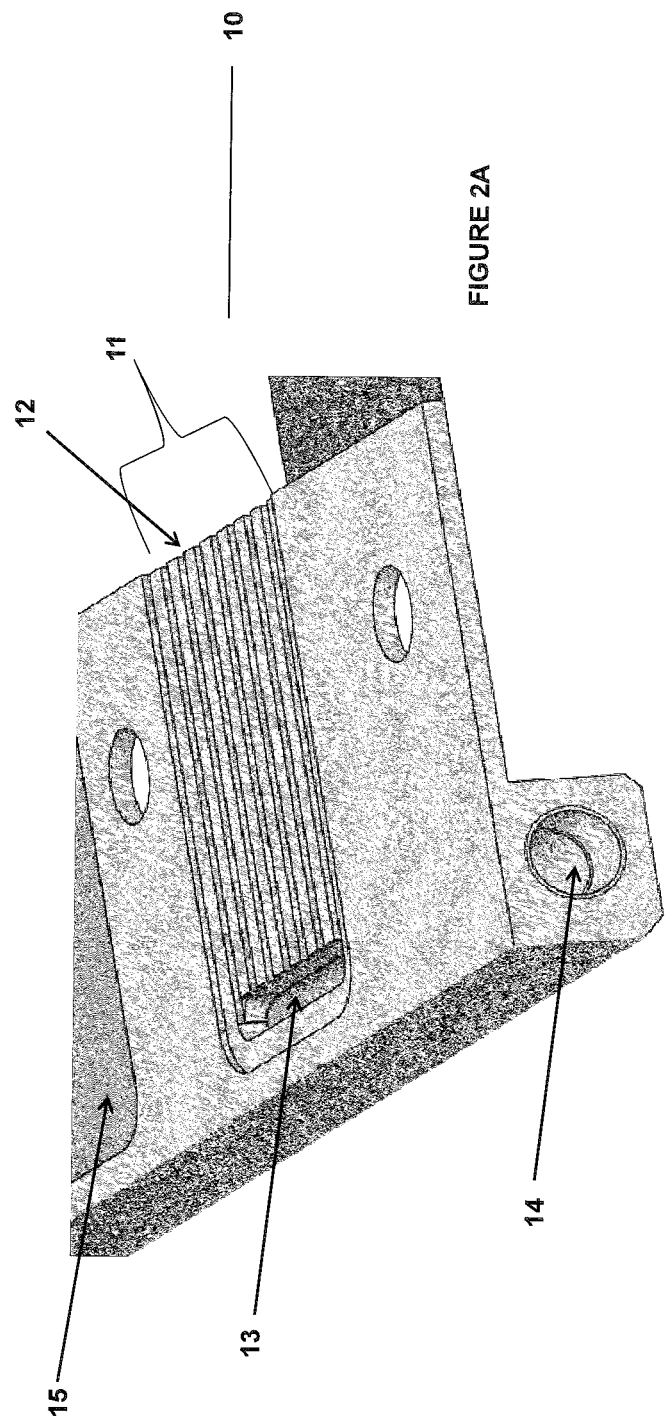
FIGS. 2A and 2B are an illustration of some embodiments related to the intermediate frame.
Figure 2B:
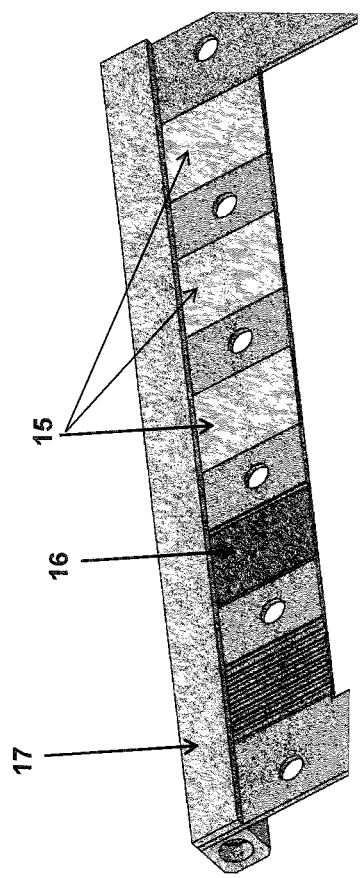
Figure 3:
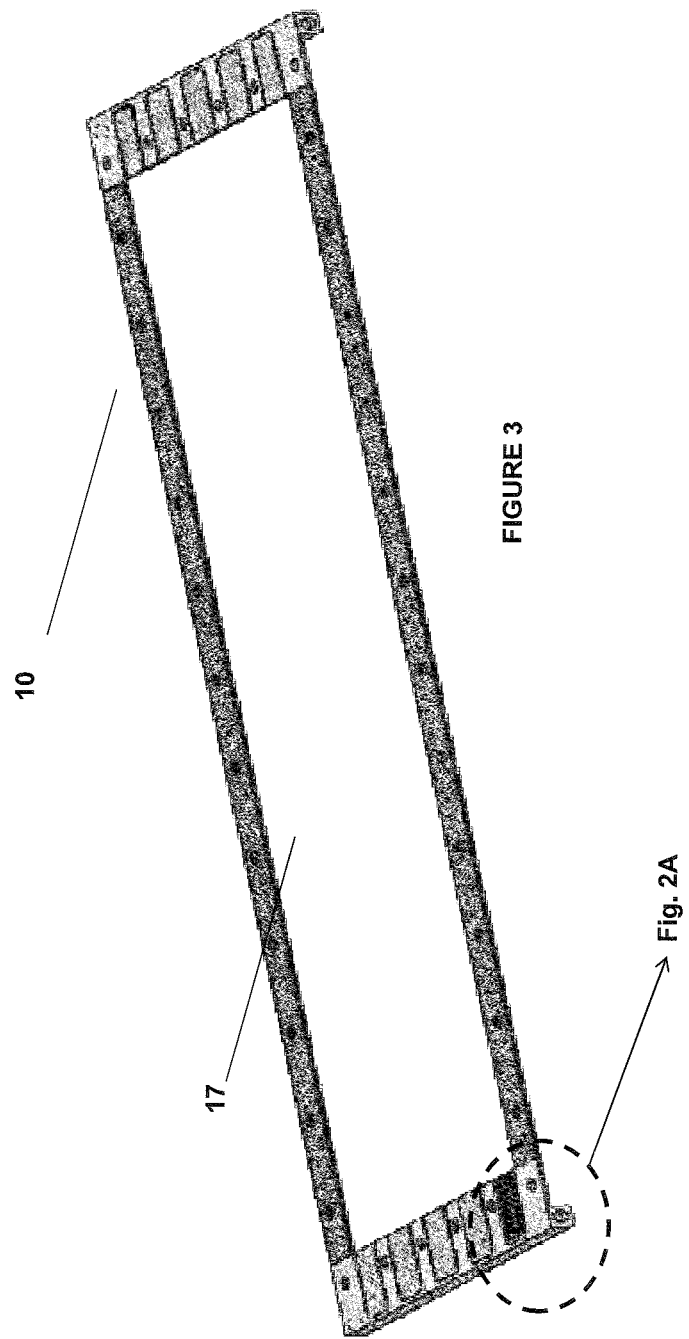
FIG. 3 illustrates some embodiments related to the intermediate frame.

In one aspect, there is provided an intermediate frame in an electrochemical cell, comprising one or more arrays of channels on upper and/or lower edges of the intermediate frame wherein the channels are configured to provide a spatially uniform flow of electrolyte through the plane of the intermediate frame. An illustrative embodiment of a portion of the intermediate frame is provided in FIGS. 2A and 2B. As illustrated in a cross-sectional view of a portion of the intermediate frame in FIG. 2A, the intermediate frame 10 comprises one or more arrays 11 of channels 12. These channels may be present on the upper, lower or both the edges of the intermediate frame. FIG. 3 illustrates the intermediate frame 10 where FIG. 2A illustrates an enlarged view of the portion of the intermediate frame shown in dashed circle. As can be seen in FIG. 3, both the upper as well as the lower edges of the frame contain arrays of the channels. However, the scope of the invention is not limited to the embodiments illustrated in the figures. The intermediate frame may have the arrays of the channels on just the upper edge or just the lower edge of the frame. All of those configurations are well within the scope of the invention. The flow of the electrolyte through the frame may be from bottom to top or top to bottom. The intermediate frame provided herein provides spatially uniform flow of the electrolyte across the length and/or width of the frame.

Applicants found that in some embodiments, the number of the channels in each of the arrays and/or the number of arrays of the channels in the upper and/or lower edges of the frame may be critical to the spatially uniform flow of the electrolyte through the plane of the intermediate frame. There may be about 1-35 arrays or higher of channels on each of the upper edge and/or the lower edge of the intermediate frame. In some embodiments, there may be between about 1-35; or between about 1-30; or between about 1-25; or between about 1-20; or between about 1-15; or between about 1-10; or between about 1-5; or between about 1-2; or between about 3-35; or between about 3-30; or between about 3-25; or between about 3-20; or between about 3-15; or between about 3-10; or between about 3-5; or between about 5-35; or between about 5-30; or between about 5-25; or between about 5-20; or between about 5-15; or between about 5-10; or between about 10-35; or between about 10-30; or between about 10-25; or between about 10-20; or between about 10-15; or between about 15-35; or between about 15-25; or between about 15-20; or between about 20-35 or 20-25 arrays of channels on each of the upper edge and/or the lower edge of the intermediate frame. For example, FIG. 2B illustrates 5 arrays of channels (described in detail below). In some embodiments, these arrays are equidistant from each other. In some embodiments, each of the arrays or each pocket and the array of channels in it, is fit between adjacent bolt holes (bolts may be used for sealing). The equidistant arrays may provide a uniform electrolyte flow when the electrolyte is fed across the width of the cell.

Each of the one or more arrays may contain between about 1-20 channels or higher. These channels function as feed channels when the electrolyte is fed through the channels into the intermediate chamber of the cell (intermediate chamber created by the intermediate frame). These channels may also function as collection channels when the electrolyte exits the intermediate chamber of the cell. For example, when the electrolyte is fed from the bottom of the cell, the channels at the lower edge of the frame act as feed channels so that the electrolyte flows from the feed channels through the intermediate chamber and exits from the channels present on the upper edge of the frame acting as collection channels. Similarly, when the electrolyte is fed from the top of the cell, the channels at the upper edge of the frame act as feed channels so that the electrolyte flows from the feed channels through the intermediate chamber and exits from the channels present on the lower edge of the frame acting as collection channels. In some embodiments, each of the one or more arrays comprise between about 1-20 channels; or between about 2-20 channels; or between about 3-20 channels; or between 5-20 channels; or between about 6-20 channels; or between about 8-20 channels; or between about 10-20; or between about 12-20; or between about 15-20; or between about 1-15 channels; or between about 3-15 channels; or between 5-15 channels; or between about 6-15 channels; or between about 8-15 channels; or between about 10-15; or between about 1-10 channels; or between about 2-10 channels; or between about 3-10 channels; or between 5-10 channels; or between about 6-10 channels; or between about 8-10 channels; or between about 3-8 channels; or between about 4-8 channels; or between about 5-8 channels; or between about 1-5 channels.

Figure 4:
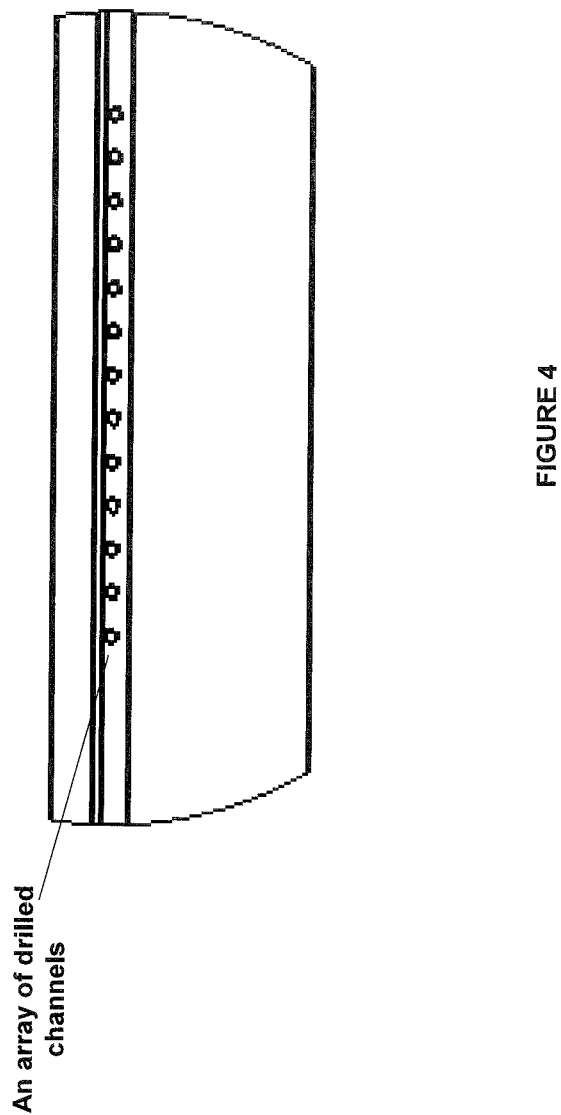
FIG. 4 illustrates some embodiments related to the array of channels drilled in the intermediate frame.

In some embodiments, the channels may be machined into or drilled through the frame. For example, the channels can be machined into the pocket that has been machined into the frame, and then the channels and the pocket are capped. In some embodiments, the channels can be drilled through the top and bottom edges of the frame, respectively. In embodiments where the channels are drilled; the pockets, the caps, and the shims may not be required. For example, FIG. 4 illustrates an array of drilled through channels where the pocket, the cap, and the shim is not required.

Figure 5:
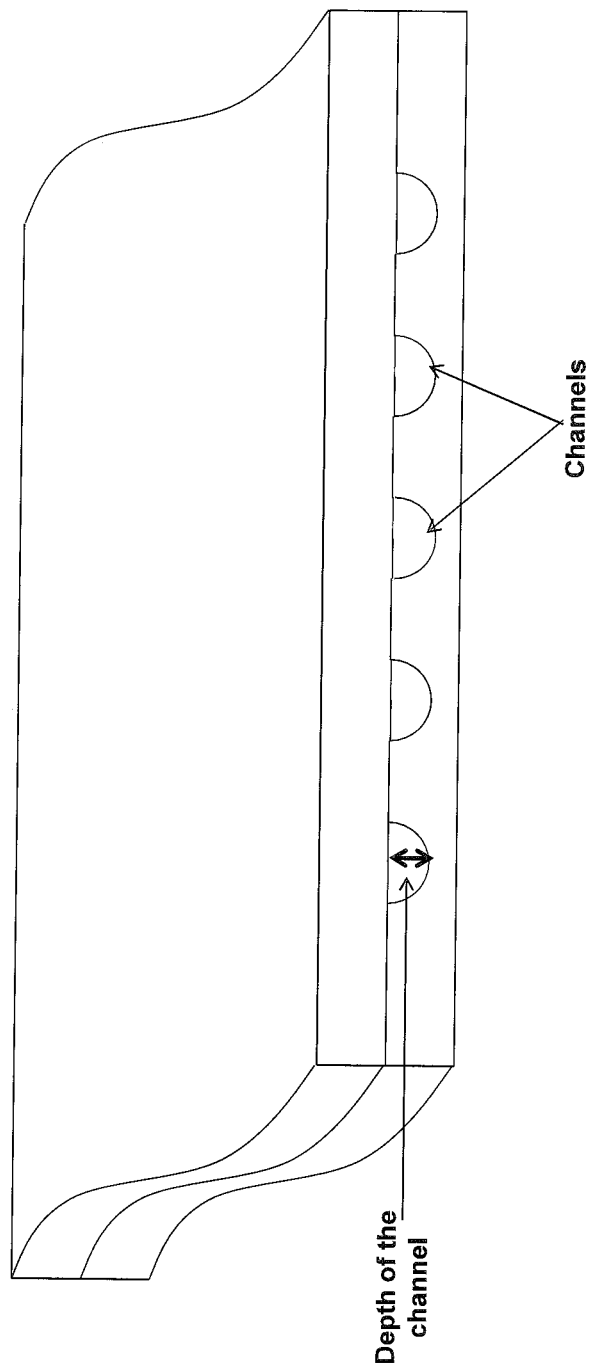
FIG. 5 illustrates some embodiments related to the array of channels with semi-circular shape in the intermediate frame.

In some embodiments, the channels are configured in such a way that the channels have a circular, semi-circular, rectangular, triangular, trapezoidal shape or any other similar shape. For example only, in some embodiments, the channels with cap and/or shim (described herein below) have aforementioned shape where the bottom of the channel is that specific shape (to maximize structural integrity/resistance to internal pressure and/or facilitate spatially uniform flow of the electrolyte) and the top of the channels is flat owing to the presence of the cap and/or the shim. Such embodiment is illustrated in FIG. 5. A cross-sectional view of the array of channels is illustrated in FIG. 5, where the channels have a semi-circular shape. Such channels with semi-circle shape correspond to the intermediate frame illustrated in FIGS. 2A, 2B, and 3.

Figure 6:
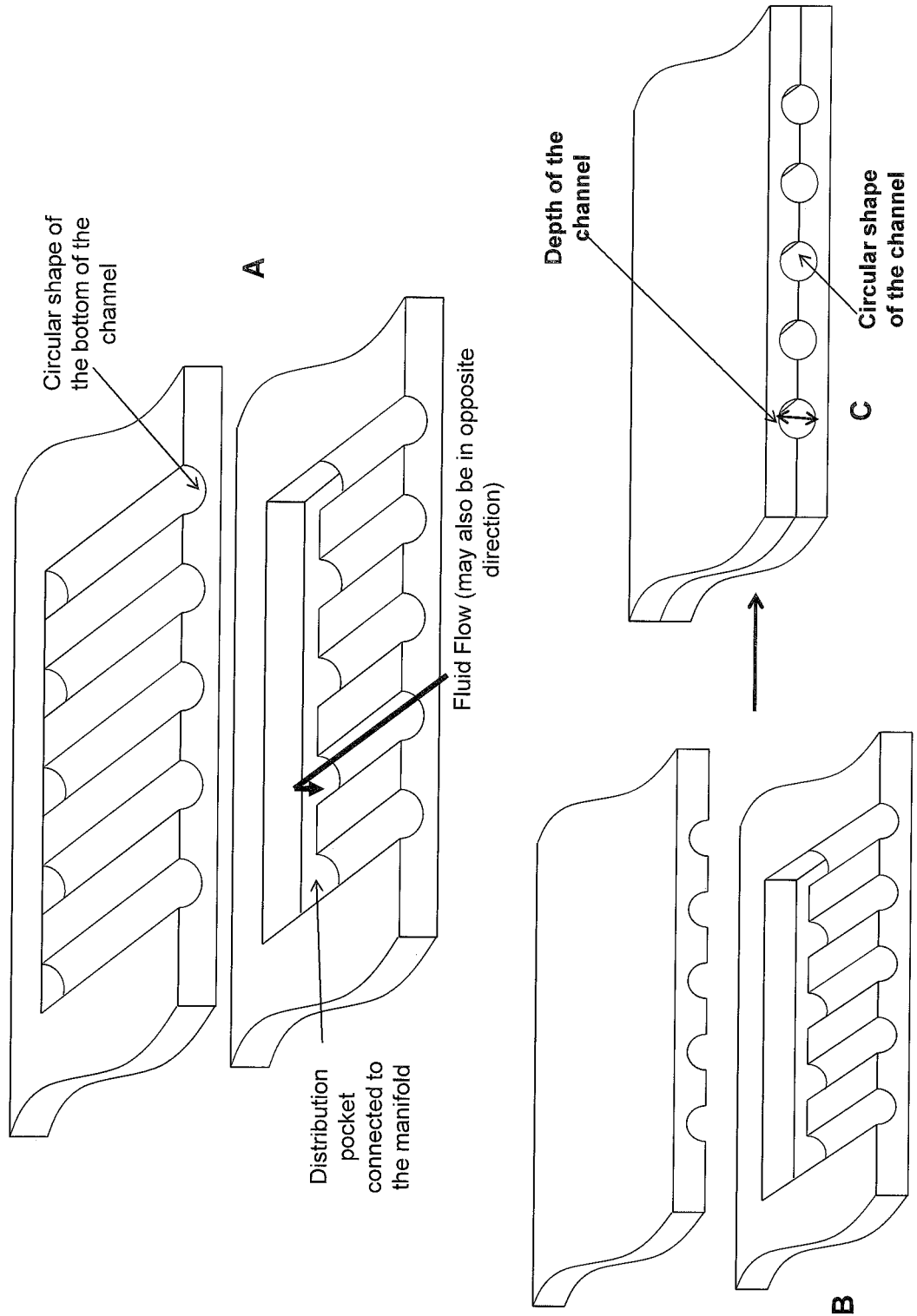
FIG. 6 illustrates some embodiments related to the array of channels with circular shape in the intermediate frame.

In some embodiments, the channels have a circular shape. Such channels may not have a cap and/or shim requirement since the channels may not collapse or flow in (as described herein below). FIG. 6 illustrates a cross-sectional view of the channels of some embodiments where the channels have a circular shape. The figure A in FIG. 6 illustrates an embodiment where channels are machined on two sheets. One sheet is cut through for distribution pocket that is connected to the manifold (explained below), and the other sheet may or may not have the distribution pocket. The top sheet may be inverted on the bottom sheet and the channels may be lined up as illustrated in B. The two sheets may be bonded with each other (glue, weld, and the like) or compressed together with gasket to form intermediate frame assembly C. FIG. 6 illustrates an example of the intermediate frame with channels in circular shape, however, various other means may be employed to configure such frame including, but not limited to, machining the channels by drilling through the frame. All of such methods to configure the intermediate frame of FIG. 6 are within the scope of the invention.

Figure 7:
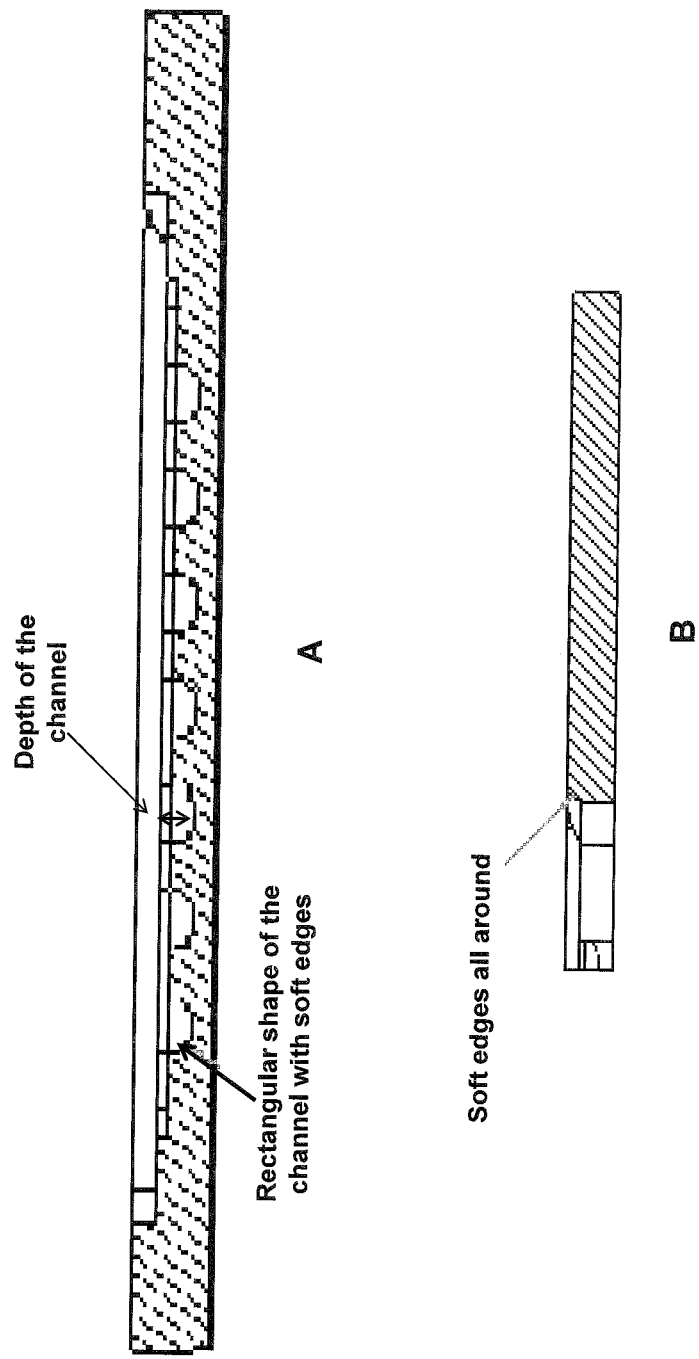
FIG. 7 illustrates some embodiments related to the array of channels with rectangular shape in the intermediate frame.

In some embodiments, the channels have a rectangular shape. In some embodiments, the rectangular shape may have soft edges to maximize structural integrity/resistance to internal pressure and/or facilitate spatially uniform flow of the electrolyte. FIG. 7 illustrates a cross-sectional view of the channels where the channels have a rectangular shape.

Figure A in FIG. 7 illustrates rectangular shaped channels where the edges of the rectangular shape are softened. Also shown in figure B of FIG. 7 is a sideways cross sectional view of the rectangular shaped channels where the corners of the channels are softened to prevent stress on the adjoining ion exchange membranes (owing to the sharp ends of the channels).

Applicants also found that in some embodiments, the dimensions of the channel e.g. depth and/or length of the channel may be critical to the spatially uniform flow of the electrolyte through the plane of the intermediate frame. For example, the depth of the channel with the semi-circular shape is illustrated in FIG. 5. The depth of the channel with the circular shape is illustrated in FIG. 6. The depth of the channel with the rectangular shape is illustrated in FIG. 7. The depth of the channels can be configured for any shape of the channels. The depth and/or length of the channels may be configured in such a way that the channels do not present a large resistance to the flow of the electrolyte coming into the cell. In some embodiments, the depth of the channel may be configured in such a way that the dynamic pressure in the cell due to the flow of the electrolyte may remain below roughly 2 psi, or below 1 psi. In some embodiments, the number of channels in each array and the depth and/or length of the channels facilitates spatially uniform flow of the electrolyte through the plane of the intermediate frame. It is desirable that the thickness of the electrolyte stays uniform across the active area of the cell. Relatively deep pockets of the electrolyte may constitute high-resistance current pathways while relatively shallow pockets of the electrolyte may constitute low-resistance current pathways. Furthermore, gas in the cell may need to pass unrestrained along the electrolyte flow path. Stagnant gas pockets may constitute high resistance areas, driving the system away from a uniform current density. Therefore, the spatially uniform flow of the electrolyte contributes significantly towards the uniform current density in the cell which is paramount for both performance and reliability of the cell.

In some embodiments, the depth of the channels is between about 0.25-10 mm; or between about 0.25-8 mm; or between about 0.25-7 mm; or between about 0.25-6 mm; or between about 0.25-5 mm; or between about 0.25-4 mm; or between about 0.25-3 mm; or between about 0.25-2 mm; or between about 0.25-1 mm; or between about 0.25-0.5 mm; or between about 0.5-10 mm; or between about 0.5-8 mm; or between about 0.5-6 mm; or between about 0.5-5 mm; or between about 0.5-4 mm; or between about 0.5-3 mm; or between about 0.5-2 mm; or between about 0.5-1 mm; or between about 1-10 mm; or between about 1-8 mm; or between about 1-6 mm; or between about 1-5 mm; or between about 1-4 mm; or between about 1-3 mm; or between about 1-2 mm; or between about 2-10 mm; or between about 2-8 mm; or between about 2-6 mm; or between about 2-4 mm; or between about 2-3 mm; or between about 3-10 mm; or between about 3-8 mm; or between about 3-6 mm; or between about 3-4 mm; or between about 5-10 mm; or between about 5-8 mm; or between about 5-6 mm; or between about 8-10 mm.

In some embodiments, the length of the channels is between about 30-100 mm; or between about 30-90 mm; or between about 30-80 mm; or between about 30-60 mm; or between about 30-50 mm; or between about 40-100 mm; or between about 40-90 mm; or between about 40-80 mm; or between about 40-60 mm; or between about 50-100 mm; or between about 50-90 mm; or between about 50-80 mm; or between about 50-70 mm; or between about 50-60 mm; or between about 60-100 mm; or between about 60-90 mm; or between about 60-80 mm; or between about 60-70 mm; or between about 70-100 mm; or between about 80-100 mm; or between about 90-100 mm. An aspect ratio of the depth of the channel to the length of the channel may depend on several factors, including but not limited to, electrolyte flow rate, viscosity, gas content etc.

Figure 8:
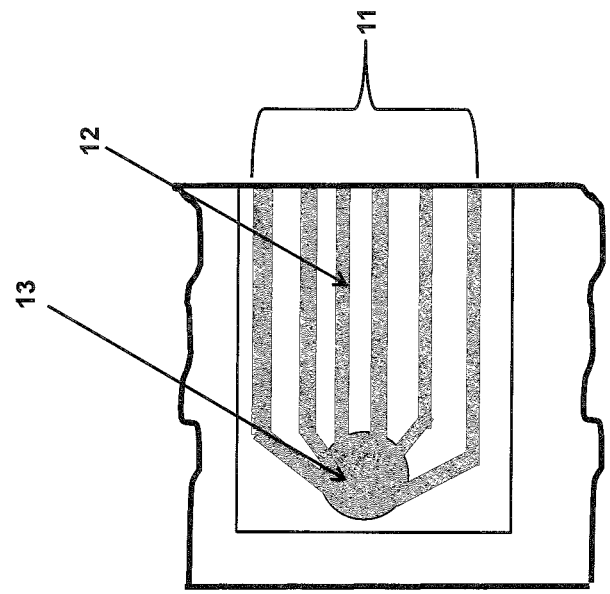
FIG. 8 illustrates some embodiments related to the distribution pockets and the array of channels in the intermediate frame.
Figure 8:
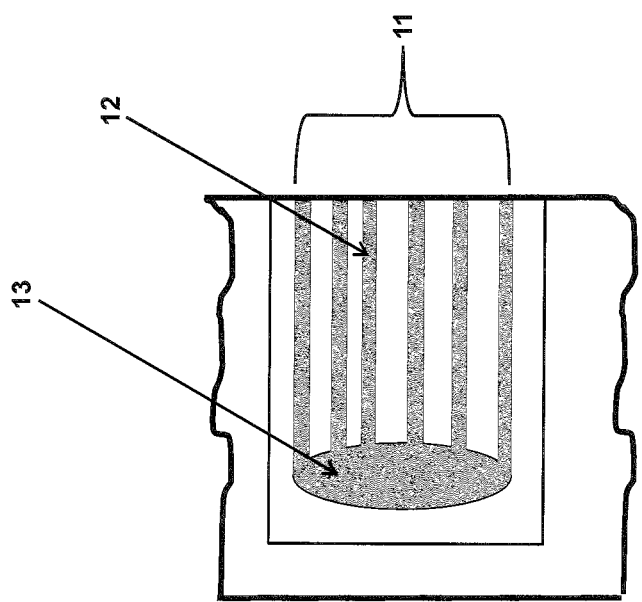

In some embodiments, the intermediate frame further comprises distribution pockets located at an end of each of the one or more arrays of channels, configured to distribute the electrolyte to the one or more arrays of channels. FIG. 2A (also FIG. 5) illustrates some embodiments of the distribution pocket 13 at the end of the array 11 of channels 12, which is configured to distribute the electrolyte to the array of channels. The array of channels may be machined into the distribution pockets to distribute the electrolyte into the intermediate chamber of the cell. While FIG. 2A illustrates the distribution pocket to be a slot like design (oval shaped), other designs are equally applicable so long as the channels can be routed along the perimeter of the pockets such that the channels are in fluid communication with the distribution pocket which is in fluid communication with the manifold. For example only, another design of the distribution pockets is illustrated in FIG. 8 as a top down view of the intermediate frame. For example, the distribution pocket 13 can be in a shape of a hole (illustrated on the right in FIG. 8) or in a shape of an oval (illustrated on the left in FIG. 8) and the array 11 of channels 12 can be routed along the perimeter of the pocket such that each channel is fed the electrolyte. In embodiments where the distribution pocket is in the shape of a hole (as illustrated in FIG. 8), the channels may be machined such that they fan out from the center of the hole until they have spread out sufficiently to traverse in parallel fashion to the edge of the frame. Other shapes of the distribution pocket includes, but not limited to, rectangular shape, square shape, triangular shape etc.

The width of the distribution pockets can be as wide as desired. For example, in some embodiments, the width of the distribution pockets is between about 6-70 mm wide; or between about 6-60 mm wide; or between about 6-50 mm wide; or between about 6-40 mm wide; or between about 6-30 mm wide; or between about 6-20 mm wide; or between about 6-10 mm wide; or between about 10-70 mm wide; or between about 10-60 mm wide; or between about 10-50 mm wide; or between about 10-40 mm wide; or between about 10-30 mm wide; or between about 10-20 mm wide; or between about 20-70 mm wide; or between about 20-60 mm wide; or between about 20-50 mm wide; or between about 20-40 mm wide; or between about 20-30 mm wide; or between about 30-70 mm wide; or between about 30-60 mm wide; or between about 30-50 mm wide; or between about 30-40 mm wide; or between about 40-70 mm wide; or between about 40-60 mm wide; or between about 40-50 mm wide; or between about 50-70 mm wide; or between about 50-60 mm wide; or between about 60-70 mm wide.

In some embodiments, the distribution pockets are operably connected to manifolds which are located at the end of the upper and/or the lower edges of the intermediate frame, and configured to provide the electrolyte to and from the distribution pockets. FIG. 2A illustrates protruding manifold 14. The manifold is located outside the sealed volume of the intermediate frame and the electrochemical cell. The channels enable the electrolyte to flow from (to) an exterior manifold into (out of) the cell, across the sealed region.

In some embodiments, the intermediate frame further comprises a cap over each of the one or more arrays of channels and the corresponding distribution pocket, configured to prevent the electrolyte from leaking. FIGS. 2A and 2B illustrate caps 15 over the arrays of the channels. FIG. 5 also illustrates channels with semi-circle shape having a cap over them. In some embodiments, the cap can be glued or welded onto the array of channels. The caps are glued or welded such that they form a leak-tight assembly. It is desirable to eliminate gaps between the edge of the caps and the edge of the pockets since the gaps may lead to leak under the gasket.

In some embodiments, the caps may flow (creep) into the underlying channels, thereby choking flow through the channels and/or introducing leakage pathways between the caps and the adjacent gasket. The "flowing" or the "creeping" of the caps, as used herein includes sagging of the caps into the channels to obstruct the flow of the electrolyte. The creeping of the channels by the caps may be prevented by using shims. In some embodiments, the intermediate frame further comprises a shim under the cap and over each of the one or more arrays of channels and the corresponding distribution pocket, configured to prevent the cap from flowing or creeping into the channels. FIG. 2B illustrates shim 16 covering the array 11 of channels 12. The cap 15 goes over the shim 16. In some embodiments, the shim may be made of material that is chemically compatible with the electrolyte being flowed and shows sufficient resistance to creep flow at elevated temperature so that it does not flow into the distribution pockets. In some embodiments, the shims are made of corrosion resistant metal e.g. titanium. The titanium is chemically resistant and is available in thin sheets. The Ti shims may provide sufficient rigidity that the caps are prevented from flowing into the channels. In some embodiments, the shim may be made of any suitable material, examples include, without limitation, titanium, titanium alloys, stainless steel alloys, nickel, nickel alloys, aluminum, aluminum alloys, copper, copper alloys, hastelloy alloys, inconel alloys, glass-filled chlorinated polyvinyl chloride (CPVC), Rulon®, thermoplastic material such as polyetheretherketone (PEEK), glass-filled polytetrafluoroethylene (PTFE), polypropylene (PP), glass-filled polypropylene (PP), fiberglass reinforced plastic (FRP), polycarbonate, and combinations thereof.

In some embodiments, the thickness of the shim is such that the shim sheet is thin yet is stiff at elevated temperatures. In some embodiments, the shim has a thickness of between about 0.1-1 mm; or between about 0.1-0.8 mm; or between about 0.1-0.5 mm; or between about 0.1-0.3 mm; or between about 0.25-1 mm; or between about 0.25-0.8 mm; or between about 0.25-0.5 mm; or between about 0.25-0.3 mm; or between about 0.3-1 mm; or between about 0.3-0.8 mm; or between about 0.3-0.5 mm; or between about 0.5-1 mm; or between about 0.5-0.8 mm; or between about 0.7-1 mm; or between about 0.8-1 mm.

In some embodiments, the internal pressure within the manifold can cause the cap to bulge up in the vicinity of the feed-through holes/slots in the frame. This bulging of the caps can be prevented by gluing or welding a thin reinforcement bar over a portion of the caps that extend outside of the cell sealing area. FIG. 2B illustrates the reinforcement bar 17 over a portion of the cap configured to prevent the cap from bulging out.

The intermediate frame can be either a single piece, or a glued/welded assembly formed from individual pieces. For example, in some embodiments, the manifolds, shims, caps, and reinforcement bars are all separate pieces that are attached to the frame to form a leak-tight, sealable assembly. FIG. 3 illustrates the intermediate frame 10 without the reinforcement bar.

In some embodiments, the thickness of the intermediate frame is critical to maintaining a spatially uniform flow of the electrolyte in the intermediate chamber and is subject to several constraints. The intermediate frame that separates the AEM from the CEM may need to keep the membrane separation minimal. The thickness of the intermediate frame may dictate the separation distance between the membranes which in turn may affect the current resistance. During operation, current passes through the electrolyte and the thickness of the electrolyte which is dependent on the thickness of the intermediate frame, may affect the electrical resistance of the electrolyte. For example, at 300 mA/cm$^2$ the electrical resistance of a typical electrolyte solution may result in a voltage drop of approximately 65 mV per mm of the electrolyte. Therefore, the thicker is the frame, the thicker is the electrolyte flow and higher may be the voltage drop.

Further, the thickness of the electrolyte needs to be uniform across the active area of the cell in order to maintain uniform current density. Relatively deep pockets of the electrolyte may constitute high-resistance current pathways; relatively shallow pockets of the electrolyte constitute low-resistance current pathways. The thickness of the electrolyte may be controlled by using an appropriate thickness of the intermediate frame and the arrays of the channels therein.

Furthermore, the thickness of the intermediate frame may need to prevent or minimize sharp bends of either the AEM or CEM. Bending of the membranes may result in internal stress that can reduce membrane lifetime. Additionally, the membranes may not contact one-another when separated by the intermediate frame. The contacting of the membranes may result in a short that can damage or destroy the cell. Therefore, the thickness of the intermediate frame provided herein needs to be such that optimum separation of the membranes is achieved; optimum thickness of the electrolyte flows through the intermediate chamber; uniform thickness of the electrolyte flows through the frame; and the frame can easily accommodate the channel design.

In some embodiments, the thickness of such intermediate frame is between about 0.75-30 mm; or between about 0.75-25 mm; or between about 0.75-20 mm; or between about 0.75-15 mm; or between about 0.75-10 mm; or between about 0.75-5 mm; or between about 0.75-2 mm; or between about 1-30 mm; or between about 1-25 mm; or between about 1-20 mm; or between about 1-15 mm; or between about 1-10 mm; or between about 1-6 mm; or between about 1-5 mm; or between about 1-3 mm; or between about 2-30 mm; or between about 2-25 mm; or between about 2-20 mm; or between about 2-15 mm; or between about 2-10 mm; or between about 2-6 mm; or between about 2-5 mm; or between about 2-3 mm; or between about 3-30 mm; or between about 3-20 mm; or between about 3-10 mm; or between about 3-6 mm; or between about 3-5 mm; or between about 4-30 mm; or between about 4-20 mm; or between about 4-10 mm; or between about 4-6 mm; or between about 5-30 mm; or between about 5-20 mm; or between about 5-10 mm; or between about 5-6 mm; or between about 10-30 mm; or between about 10-20 mm; or between about 20-30 mm. In some embodiments, the intermediate frame of thickness between about 0.75-30 mm comprises about 1-20 channels in each array where the intermediate frame has between about 1-35 arrays of channels. In some embodiments, the intermediate frame of thickness between about 1-6 mm comprises about 3-10 channels in each array where the intermediate frame has between about 3-35 arrays of channels. In some embodiments, the foregoing intermediate frame comprises channels having a depth of between about 0.25-10 mm; or between about 0.25-8 mm; or between about 0.25-5 mm; or between about 0.25-4 mm.

In some embodiments, the intermediate frame is made of material that is resistant to acidic and/or basic mediums, variable temperature ranges, and metal ion containing anolytes. For example, the intermediate frame may be made of titanium or a polymeric material. Examples of polymeric materials include, without limitation, chlorinated polyvinyl chloride (CPVC), heat stabilized polypropylene (PP), ULTEM, PEEK, glass-filled PTFE, PTFE, glass-filled PP, glass-filled CPVC, styrene copolymer, fiber glass reinforced plastic (FRP), or combinations thereof. In some embodiments, the intermediate frame is configured to withstand temperature between about 70-150° C. In some embodiments, the intermediate frame is configured to withstand pressure between 2-10 psi.

In some embodiments, the intermediate frame further comprises a spacer in an open area in middle of the intermediate frame. The open area is illustrated as 17 in the intermediate frame 10 of FIG. 3. The open space in the frame may have a spacer material in order to further prevent the membranes from contacting each other. The spacer may be held in place in the intermediate frame by any means. Example include without limitation, hooks or pegs in the frame to hold the spacer in place. The spacer may be made of any polymeric materials listed herein. In some embodiments, the thickness of the spacer may be less than or equal to the intermediate frame. In some embodiments, the spacer may present little resistance to the electrolyte flow, readily release gas, and provide sufficient coverage to prevent membranes from contacting each other. In some embodiments, the spacer may be configured to withstand temperature between about 70-150° C. and/or pressure between 2-10 psi.

In some embodiments there is provided an intermediate frame in an electrochemical cell, comprising one or more arrays of channels on upper and/or lower edges of the intermediate frame wherein the channels are configured to provide a spatially uniform flow of electrolyte through the plane of the intermediate frame wherein the intermediate frame comprises between about 1-20 channels in each of the arrays, wherein the intermediate frame comprises between about 1-35 arrays of channels on each of the upper and/or lower edges of the intermediate frame, and wherein the depth of each of the channel is between about 0.25-10 mm. In some embodiments, the foregoing intermediate frame is of thickness between about 0.75-30 mm.

In some embodiments there is provided an intermediate frame in an electrochemical cell, comprising one or more arrays of channels on upper and/or lower edges of the intermediate frame wherein the channels are configured to provide a spatially uniform flow of electrolyte through the plane of the intermediate frame wherein the intermediate frame comprises between about 3-7 channels in each of the arrays, wherein the intermediate frame comprises between about 5-25 arrays of channels on each of the upper and/or lower edges of the intermediate frame, and wherein the depth of each of the channel is between about 0.25-4 mm. In some embodiments, the foregoing intermediate frame is of thickness between about 1-6 mm.

One or more of the foregoing aspects and embodiments related to the channels, arrays of the channels, distribution pockets, manifolds, caps, shims, spacer, and/or reinforcement bars may be combined to provide the intermediate frame of the invention.

In another aspect, there is provided an electrochemical system that contains the intermediate frame provided herein.

In one aspect, there is provided an electrochemical system comprising an anode chamber comprising an anode in contact with an anode electrolyte; a cathode chamber comprising a cathode in contact with a cathode electrolyte; and an intermediate frame comprising one or more arrays of channels on upper and/or lower edges of the intermediate frame wherein the channels are configured to provide a spatially uniform flow of electrolyte through the plane of the intermediate frame. Various embodiments related to the material of construction of the intermediate frame and the configuration of the channels, arrays of the channels, distribution pockets, manifolds, caps, shims, spacer, and/or reinforcement bars, have been described herein and all of those configurations are applicable to the foregoing electrochemical systems.

In the foregoing aspects, in some embodiments, the anode is configured to oxidize the metal ions from a lower oxidation state to a higher oxidation state. For example, in some embodiments, the anode is configured to oxidize copper ions from $Cu(I)Cl$ to $Cu(II)Cl_2$. Examples of the other metal ions include, without limitation, copper ions, platinum ions, tin ions, chromium ions, iron ions etc. The metal ions may be present as a metal halide or a metal sulfate.

The electrochemical cell provided herein may be any electrochemical cell that uses an intermediate frame. The reactions in the electrochemical cell using the components of the invention may be any reaction carried out in the electrochemical cell including but not limited to chlor-alkali processes. In some embodiments, the electrochemical cell has an anode electrolyte containing metal ions and the anode oxidizes the metal ions from the lower oxidation state to the higher oxidation state in the anode chamber. Such electrochemical cells have been described in detail in U.S. Pat. No. 9,187,834, issued Nov. 17, 2015, which is incorporated herein by reference in its entirety.

In the electrochemical cells provided herein, the cathode reaction may be any reaction that does or does not form an alkali in the cathode chamber. Such cathode consumes electrons and carries out any reaction including, but not limited to, the reaction of water to form hydroxide ions and hydrogen gas; or reaction of oxygen gas and water to form hydroxide ions; or reduction of protons from an acid such as hydrochloric acid to form hydrogen gas; or reaction of protons from hydrochloric acid and oxygen gas to form water. In some embodiments, the electrochemical cells may include production of alkali in the cathode chamber of the cell.

The electron(s) generated at the anode are used to drive the reaction at the cathode. The cathode reaction may be any reaction known in the art. The anode chamber and the cathode chamber are separated by the IEMs and the intermediate frame provided herein that may allow the passage of ions, such as, but not limited to, sodium ions in some embodiments to the cathode electrolyte if the electrolyte in the intermediate chamber is sodium chloride, sodium bromide, sodium iodide, sodium sulfate; or ammonium ions if the electrolyte is ammonium chloride etc.; or an equivalent solution containing metal halide. In some embodiments, the IEMs and the intermediate frame allows the passage of anions, such as, but not limited to, chloride ions, bromide ions, iodide ions, or sulfate ions to the anode electrolyte if the electrolyte in the intermediate chamber is e.g., sodium chloride, sodium bromide, sodium iodide, or sodium sulfate or an equivalent solution. The sodium ions may combine with hydroxide ions in the cathode electrolyte to form sodium hydroxide. The anions may combine with metal ions in the anode electrolyte to form metal halide or metal sulfate.

In some embodiments of the electrochemical cell, the electrolyte (e.g., sodium chloride, sodium bromide, sodium iodide, sodium sulfate, ammonium chloride, HCl, or combinations thereof or an equivalent solution) is disposed through the manifold into the intermediate frame between the AEM and the CEM. The ions, e.g. sodium ions, from the electrolyte pass from the intermediate chamber through CEM to form e.g. sodium hydroxide in the cathode chamber and the halide anions such as, chloride, bromide or iodide ions, or sulfate anions, from the electrolyte pass from the intermediate chamber through the AEM to form HCl or a solution for metal halide or metal sulfate in the anode chamber. The electrolyte, after the transfer of the ions, can be withdrawn from the intermediate frame in the intermediate chamber (through the distribution pockets and manifolds in the lower edge of the frame if the flow of the electrolyte is from top to bottom) as depleted ion solution. For example, in some embodiments when the electrolyte is sodium chloride solution, then after the transfer of the sodium ions to the cathode electrolyte and transfer of chloride ions to the anode electrolyte, the depleted sodium chloride solution may be withdrawn from the intermediate frame in the intermediate chamber.

The electrochemical cells in the methods and systems provided herein are membrane electrolyzers. The electrochemical cell may be a single cell or may be a stack of cells connected in series or in parallel. The electrochemical cell may be a stack of 5 or 6 or 50 or 100 or more electrolyzers connected in series or in parallel. Each cell comprises the anode, the cathode, the AEM, the CEM, and the intermediate frame, as illustrated in FIG. 1. In some embodiments, the electrolyzers provided herein are monopolar electrolyzers. In the monopolar electrolyzers, the electrodes may be connected in parallel where all anodes and all cathodes are connected in parallel. In such monopolar electrolyzers, the operation takes place at high amperage and low voltage. In some embodiments, the electrolyzers provided herein are bipolar electrolyzers. In the bipolar electrolyzers, the electrodes may be connected in series where all anodes and all cathodes are connected in series. In such bipolar electrolyzers, the operation takes place at low amperage and high voltage. In some embodiments, the electrolyzers are a combination of monopolar and bipolar electrolyzers and may be called hybrid electrolyzers.

In some embodiments of the bipolar electrolyzers as described above, the cells are stacked serially constituting the overall electrolyzer and are electrically connected in two ways. In bipolar electrolyzers, a single plate, called bipolar plate, may serve as base plate for both the cathode and anode. The electrolyte solution may be hydraulically connected through common manifolds and collectors internal to the cell stack. The stack may be compressed externally to seal all frames and plates against each other, which are typically referred to as a filter press design. In some embodiments, the bipolar electrolyzer may also be designed as a series of cells, individually sealed, and electrically connected through back-to-back contact, typically known as a single element design. The single element design may also be connected in parallel in which case it would be a monopolar electrolyzer.

In some embodiments, the anode used in the electrochemical systems may contain a corrosion stable base support. Other examples of base materials include, but not limited to, sub-stoichiometric titanium oxides, such as, Magneli phase sub-stoichiometric titanium oxides having the formula $TiO_x$ wherein x ranges from about 1.67 to about 1.9. Some examples of titanium sub-oxides include, without limitation, titanium oxide $Ti_4O_7$. The base materials also include, without limitation, metal titanates such as $M_xTi_yO_z$ such as $M_xTi_4O_7$, etc.

In some embodiments, the anode is not coated with an electrocatalyst. In some embodiments, the electrodes described herein (including anode and/or cathode) contain an electrocatalyst for aiding in electrochemical dissociation, e.g. reduction of oxygen at the cathode or the oxidation of the metal ion at the anode. Examples of electrocatalysts include, but not limited to, highly dispersed metals or alloys of the platinum group metals, such as platinum, palladium, ruthenium, rhodium, iridium, or their combinations such as platinum-rhodium, platinum-ruthenium, titanium mesh coated with PtIr mixed metal oxide or titanium coated with galvanized platinum; electrocatalytic metal oxides, such as, but not limited to, $IrO_2$; silver, gold, tantalum, carbon, graphite, organometallic macrocyclic compounds, and other electrocatalysts well known in the art for electrochemical reduction of oxygen or oxidation of metal.

In some embodiments, the electrodes described herein, relate to porous homogeneous composite structures as well as heterogeneous, layered type composite structures wherein each layer may have a distinct physical and compositional make-up, e.g. porosity and electroconductive base to prevent flooding, and loss of the three phase interface, and resulting electrode performance.

Any of the cathodes provided herein can be used in combination with any of the anodes described above. In some embodiments, the cathode used in the electrochemical systems of the invention, is a hydrogen gas producing cathode. In some embodiments, the cathode used in the electrochemical systems of the invention, is a hydrogen gas producing cathode that does not form an alkali. The hydrogen gas may be vented out or captured and stored for commercial purposes. In some embodiments, the cathode in the electrochemical systems of the invention may be a gas-diffusion cathode. In some embodiments, the gas-diffusion cathode, as used herein, is an oxygen depolarized cathode (ODC). The oxygen at the cathode may be atmospheric air or any commercial available source of oxygen. In some embodiments, the cathode in the electrochemical systems of the invention may be a gas-diffusion cathode that reacts HCl and oxygen gas to form water. The oxygen at the cathode may be atmospheric air or any commercial available source of oxygen.

In some embodiments, the electrolyte in the electrochemical systems and methods described herein include the aqueous medium containing more than 1 wt % water. In some embodiments, the aqueous medium includes more than 1 wt % water; more than 5 wt % water; or more than 5.5 wt % water; or more than 6 wt %; or more than 20 wt % water; or more than 25 wt % water; or more than 30 wt % water. In some embodiments, the aqueous medium may comprise an organic solvent such as, e.g. water soluble organic solvent.

In some embodiments of the methods and systems described herein, the amount of total metal ion in the anode electrolyte in the electrochemical cell or the amount of copper in the anode electrolyte or the amount of iron in the anode electrolyte or the amount of chromium in the anode electrolyte or the amount of tin in the anode electrolyte or the amount of platinum is between 1-12M; or between 1-11M; or between 1-10M; or between 1-9M; or between 1-8M; or between 1-7M; or between 1-6M; or between 1-5M; or between 1-4M; or between 1-3M; or between 1-2M. In some embodiments, the amount of total ion in the anode electrolyte, as described above, is the amount of the metal ion in the lower oxidation state plus the amount of the metal ion in the higher oxidation state; or the total amount of the metal ion in the higher oxidation state; or the total amount of the metal ion in the lower oxidation state.

In some embodiments of the methods and systems described herein, the anode electrolyte in the electrochemical systems and methods provided herein contains the metal ion in the higher oxidation state in the range of 4-7M, the metal ion in the lower oxidation state in the range of 0.1-2M and the electrolyte in the intermediate chamber e.g. sodium chloride in the range of 1-3M. The anode electrolyte may optionally contain 0.01-0.1M hydrochloric acid. In some embodiments of the methods and systems described herein, the anode electrolyte may contain another cation in addition to the metal ion. Other cation includes, but is not limited to, alkaline metal ions and/or alkaline earth metal ions, such as but not limited to, lithium, sodium, calcium, magnesium, etc. The amount of the other cation added to the anode electrolyte may be between 0.01-5M; or between 0.01-1M; or between 0.05-1M; or between 0.5-2M; or between 1-5M.

In some embodiments, the aqueous electrolyte including the catholyte or the cathode electrolyte and/or the anolyte or the anode electrolyte, or the electrolyte introduced into the intermediate frame disposed between the AEM and the CEM, in the systems and methods provided herein include, but is not limited to, saltwater or fresh water. The saltwater includes, but is not limited to, seawater, brine, and/or brackish water. Saltwater is employed in its conventional sense to refer to a number of different types of aqueous fluids other than fresh water, where the saltwater includes, but is not limited to, brine as well as other salines having a salinity that is greater than that of freshwater. Brine is water saturated or nearly saturated with salt and has a salinity that is 50 ppt (parts per thousand) or greater.

In some embodiments, the electrolyte including the cathode electrolyte and/or the anode electrolyte and/or the electrolyte introduced into the intermediate frame, such as, saltwater include water containing more than 1% chloride content, e.g. alkali metal halides including sodium halide, potassium halide etc. e.g. more than 1% NaCl; or more than 10% NaCl; or more than 50% NaCl; or more than 70% NaCl; or between 1-99% NaCl; or between 1-70% NaCl; or between 1-50% NaCl; or between 1-10% NaCl; or between 10-99% NaCl; or between 10-50% NaCl; or between 20-99% NaCl; or between 20-50% NaCl; or between 30-99% NaCl; or between 30-50% NaCl; or between 40-99% NaCl; or between 40-50% NaCl; or between 50-90% NaCl; or between 60-99% NaCl; or between 70-99% NaCl; or between 80-99% NaCl; or between 90-99% NaCl; or between 90-95% NaCl. In some embodiments, the above recited percentages apply to ammonium chloride, ferric chloride, sodium bromide, sodium iodide, or sodium sulfate as an electrolyte. The percentages recited herein include wt % or wt/wt % or wt/v %. It is to be understood that all the electrochemical systems described herein that contain sodium chloride can be replaced with other suitable electrolytes, such as, but not limited to, ammonium chloride, sodium bromide, sodium iodide, sodium sulfate, potassium salts, or combination thereof.

As used herein, the "voltage" includes a voltage or a bias applied to or drawn from an electrochemical cell that drives a desired reaction between the anode and the cathode in the electrochemical cell. In some embodiments, the desired reaction may be the electron transfer between the anode and the cathode such that an alkaline solution, water, or hydrogen gas is formed in the cathode electrolyte and the metal ion is oxidized at the anode. In some embodiments, the desired reaction may be the electron transfer between the anode and the cathode such that the metal ion in the higher oxidation state is formed in the anode electrolyte from the metal ion in the lower oxidation state. The voltage may be applied to the electrochemical cell by any means for applying the current across the anode and the cathode of the electrochemical cell. Such means are well known in the art and include, without limitation, devices, such as, electrical power source, fuel cell, device powered by sun light, device powered by wind, and combinations thereof. The type of electrical power source to provide the current can be any power source known to one skilled in the art. For example, in some embodiments, the voltage may be applied by connecting the anodes and the cathodes of the cell to an external direct current (DC) power source. The power source can be an alternating current (AC) rectified into DC. The DC power source may have an adjustable voltage and current to apply a requisite amount of the voltage to the electrochemical cell.

In some aspects, there are provided methods to use and make the intermediate frame and/or the electrochemical systems containing the intermediate frame provided herein.

In one aspect, there is provided a method of using an intermediate frame in an electrochemical cell, comprising:
applying voltage to an anode and a cathode in an electrochemical cell;
contacting the anode with an anode electrolyte in an anode chamber;
contacting the cathode with a cathode electrolyte in a cathode chamber; and
contacting an electrolyte with an intermediate frame wherein the intermediate frame comprises one or more arrays of channels on upper and/or lower edges of the intermediate frame wherein the channels are configured to provide a spatially uniform flow of the electrolyte through the plane of the intermediate frame.

In one aspect, there is provided a method of using an intermediate frame in an electrochemical cell, comprising:
applying voltage to an anode and a cathode in an electrochemical cell;
contacting the anode with an anode electrolyte wherein the anode electrolyte comprises metal ions and the anode oxidizes the metal ions from a lower oxidation state to a higher oxidation state;
contacting the cathode with a cathode electrolyte in a cathode chamber; and
contacting an electrolyte with an intermediate frame wherein the intermediate frame comprises one or more arrays of channels on upper and/or lower edges of the intermediate frame wherein the channels are configured to provide a spatially uniform flow of the electrolyte through the plane of the intermediate frame.

In some embodiments of the foregoing aspects, the intermediate frame withstands temperature between about 70-150° C. and/or the intermediate frame withstands pressure between 2-10 psi.

In some embodiments of the foregoing aspects and embodiments, the channels provide a spatially uniform flow of the electrolyte through the width of the electrochemical cell.

In some embodiments of the foregoing aspects and embodiments, the method further comprises contacting an anion exchange membrane between the intermediate frame and the anode and contacting a cation exchange membrane between the intermediate frame and the cathode.

In some embodiments of the foregoing aspects and embodiments, the intermediate frame provides advantages (also described herein above) selected from the group consisting of minimal membrane separation; uniform current density; no bending of the membrane; low dynamic pressure in the cell; minimal resistance to the electrolyte and gas; and combinations thereof.

In some embodiments of the foregoing aspects and embodiments, the intermediate frame comprises between about 1-20 or 3-10 channels in each of the one or more arrays. In some embodiments of the foregoing aspects and embodiments, the intermediate frame comprises between about 1-35 or 3-35 of the arrays of channels on each of the upper and/or lower edges of the intermediate frame. In some embodiments of the foregoing aspects and embodiments, each of the channels has a depth of between about 0.25-10 mm or 0.25-4 mm.

In some embodiments of the foregoing aspects and embodiments, the method further comprises contacting the electrolyte with distribution pockets located at an end of each of the one or more arrays of channels before contacting the electrolyte with the one or more arrays of channels. In some embodiments, the distribution pockets are between about 6-70 mm wide.

In some embodiments of the foregoing aspects and embodiments, the method further comprises contacting the electrolyte with a manifold located at an end of the upper and/or the lower edges of the intermediate frame before contacting the electrolyte with the distribution pockets.

In some embodiments of the foregoing aspects and embodiments, the method further comprises placing a cap over each of the one or more arrays of channels and the corresponding distribution pocket to prevent the electrolyte from leaking.

In some embodiments of the foregoing aspects and embodiments, the method further comprises placing a shim under the cap and over each of the one or more arrays of channels and the corresponding distribution pocket to prevent the cap from flowing into the channels.

In some embodiments of the foregoing aspects and embodiments, the shim has a thickness of between about 0.1-1 mm.

In some embodiments of the foregoing aspects and embodiments, the method further comprises placing a reinforcement bar over a portion of the cap to prevent the cap from bulging out.

In some embodiments of the foregoing aspects and embodiments, the thickness of the intermediate frame is between about 0.75-30 mm or 1-6 mm.

In some embodiments of the foregoing aspects and embodiments, the method further comprises placing a spacer in an open area in middle of the intermediate frame. In some embodiments, the method further comprises holding the spacer in place using means such as but not limited to, pegs, clips, hooks or the like. In some embodiments, the spacer may be welded or glued to the intermediate frame.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Electrochemical System with Intermediate Frame

The cell was built up layer by layer starting with the anode. After adding the AEM, a gasket was placed around the perimeter of the cell. The intermediate frame, made of CPVC, was then positioned on the gasket. The intermediate frame contained seven channels per array and five arrays of channels on each upper and lower edges of the frame, where the depth of each channel was about 0.74 mm. The thickness of the frame was about 3.2 mm. The separator was next added to the center region of the intermediate frame. A gasket was then placed along the perimeter of the intermediate frame. The CEM was then added. Another gasket was placed on the CEM. Finally, the cathode was positioned on top of the whole stack. Flange bars were positioned against the outer flanges of both the anode and the cathode. Bolts were positioned into all of the holes such that they spanned from anode loading bar to cathode loading bar. Nuts were added to all bolts. The nuts were tightened in a controlled sequence (to insure good sealing) to a preliminary torque. The same tightening sequence was then repeated using the final torque. Thus, all adjacent components between the anode and cathode flanges were sealed using compressed gaskets.

Fluid and electrical connections were made. The intermediate chamber created by the intermediate frame was filled with sodium chloride electrolyte solution. While the electrolyte continued to flow, the cathode was filled with caustic solution. Once the cathode was full, the anode was filled with copper solution containing sodium chloride (anolyte). A rectifier was used to drive the desired current through the cell once all three streams were flowing through the cell. During operation, the temperature of all the three streams (and thus the cell components) was approximately 90° C. The electrolyte, caustic solution, and copper solution flow rates were approximately 110 kg/h, 70 kg/h and 400 kg/h, respectively, throughout each run.

Figure 9:
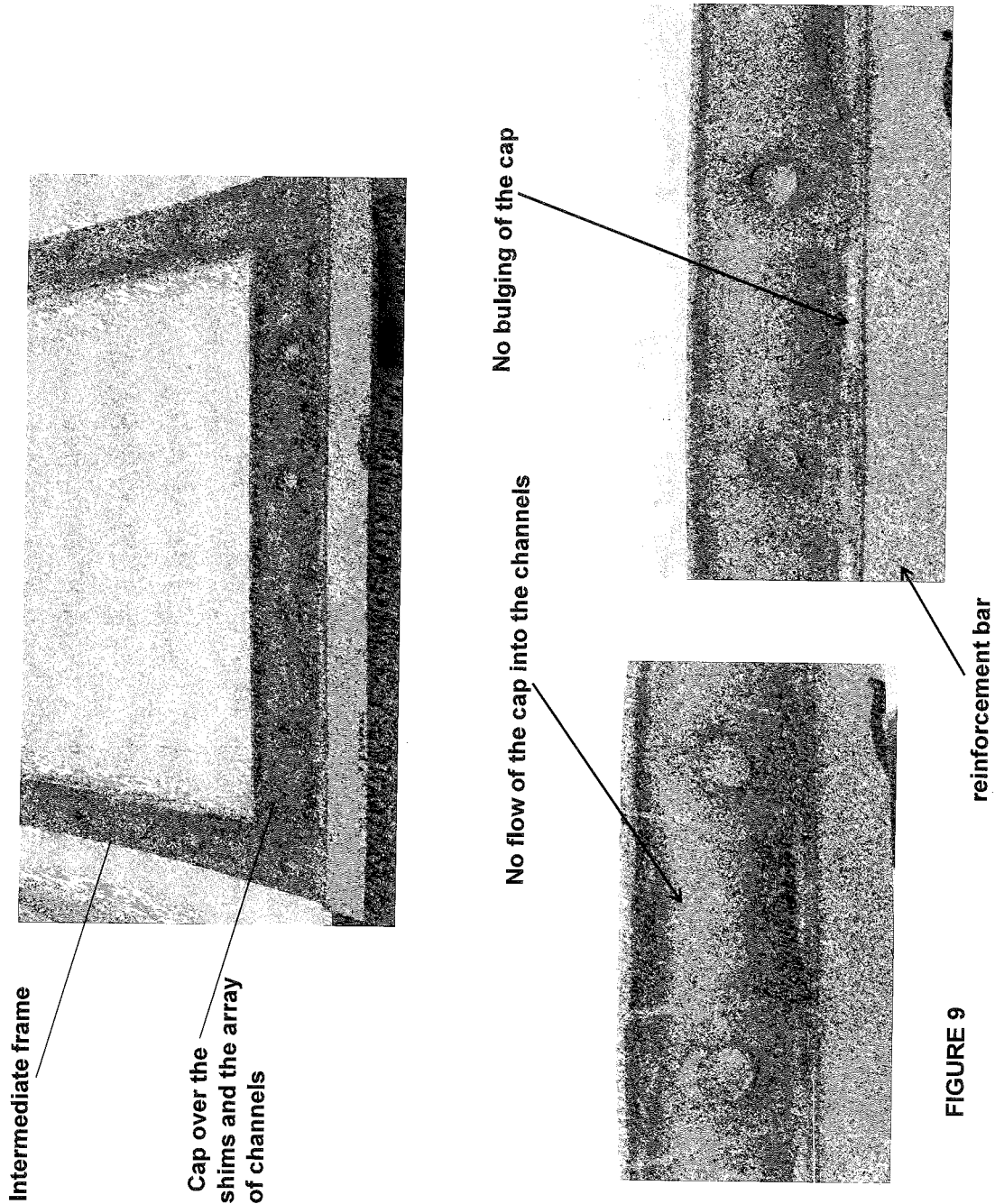
FIG. 9 illustrates some embodiments related to the intermediate frame as described in Example 1 herein.

As illustrated in FIG. 9, the intermediate frame design with array of channels, caps, and shims, worked efficiently. The intermediate frame had shims under the caps. The caps did not flow into and clog the channels and there was no outward bulging of the caps by the internal electrolyte pressure.

Example 2

Electrochemical System with Intermediate Frame

The cell was built up layer by layer starting with the anode, as described in Example 1 above. The intermediate frame contained five channels per array and one array of channels on each upper and lower edges of the frame, where the depth of each channel was about 1 mm. The thickness of the frame was about 3.2 mm. The intermediate frame was made of heat stabilized polypropylene. The electrochemical cell was run, as described in Example 1. The electrolyte, caustic solution, and copper solution flow rates were approximately 7 kg/h, 7 kg/h and 20 kg/h, respectively, throughout each run. This intermediate frame design with array of channels worked efficiently.

What is claimed is:

1. An intermediate frame in an electrochemical cell, comprising:
    3-35 arrays of channels on upper and/or lower edges of the intermediate frame wherein the channels are configured to provide a spatially uniform flow of electrolyte through the plane of the intermediate frame and wherein the channels traverse in parallel fashion;
    a distribution pocket located on the upper and/or the lower edges of the intermediate frame at an end of each of the 3-35 arrays of channels; and
    an exterior manifold operably connected to the distribution pockets and located outside sealed volume of the intermediate frame at an end of the upper and/or the lower edges of the intermediate frame.

2. The intermediate frame of claim 1, comprising between about 2-20 channels in each of the 3-35 arrays.

3. The intermediate frame of claim 1, comprising between about 5-30 arrays of channels on each of the upper and/or lower edges of the intermediate frame.

4. The intermediate frame of claim 1, wherein each of the channels has a depth of between about 0.25-10 mm.

5. The intermediate frame of claim 1, wherein each of the channels is in a shape of a circle, semi-circle, rectangular, triangular, or trapezoidal.

6. The intermediate frame of claim 1, wherein the distribution pockets are configured to distribute the electrolyte to the 3-35 arrays of channels.

7. The intermediate frame of claim 1, wherein the distribution pockets are between about 6-70 mm wide.

8. The intermediate frame of claim 6, further comprising a cap over each of the 3-35 arrays of channels and the corresponding distribution pocket configured to prevent the electrolyte from leaking.

9. The intermediate frame of claim 8, further comprising a shim under the cap and is covering each of the 3-35 arrays of channels and the corresponding distribution pocket configured to prevent the cap from flowing into the channels.

10. The intermediate frame of claim 9, wherein the shim has a thickness of between about 0.1-1 mm.

11. The intermediate frame of claim 8, further comprising a reinforcement bar over a portion of the cap configured to prevent the cap from bulging out.

12. The intermediate frame of claim 1, wherein the thickness of the intermediate frame is between about 0.75-30 mm.

13. The intermediate frame of claim 1, further comprising a spacer in an open area in middle of the intermediate frame.

14. The intermediate frame of claim 1, wherein the intermediate frame is made of titanium or polymeric material.

15. An intermediate frame in an electrochemical cell, comprising:
    3-35 arrays of channels on upper and/or lower edges of the intermediate frame wherein the channels are configured to provide a spatially uniform flow of electrolyte through the plane of the intermediate frame, wherein the channels traverse in parallel fashion, and wherein the intermediate frame comprises between about 2-20 channels in each of the arrays;
    a distribution pocket located on the upper and/or the lower edges of the intermediate frame at an end of each of the 3-35 arrays of channels; and an exterior manifold operably connected to the distribution pockets and located outside sealed volume of the intermediate frame at an end of the upper and/or the lower edges of the intermediate frame.

16. An electrochemical cell, comprising the intermediate frame of claim 1.

17. The intermediate frame of claim 1, wherein the exterior manifold is configured to provide the electrolyte to the distribution pockets.

\* \* \* \* \*